(12) United States Patent
Wang et al.

(10) Patent No.: US 11,572,026 B2
(45) Date of Patent: Feb. 7, 2023

(54) FASTENER

(71) Applicant: ILLINOIS TOOL WORKS INC., Glenview, IL (US)

(72) Inventors: Xing Wang, Shanghai (CN); Mengli Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 57 days.

(21) Appl. No.: 16/900,053

(22) Filed: Jun. 12, 2020

(65) Prior Publication Data

US 2020/0391675 A1    Dec. 17, 2020

(51) Int. Cl.
    *F16B 5/06*      (2006.01)
    *B60R 13/02*      (2006.01)

(52) U.S. Cl.
    CPC ........ *B60R 13/0206* (2013.01); *F16B 5/0628* (2013.01); *F16B 5/0664* (2013.01)

(58) Field of Classification Search
    CPC ... B60R 13/0206; F16B 5/0628; F16B 5/0664
    See application file for complete search history.

(56) References Cited

U.S. PATENT DOCUMENTS

| | | | | |
|---|---|---|---|---|
| 4,952,106 A * | 8/1990 | Kubogochi | ......... | F16B 19/1081 411/48 |
| 5,211,519 A * | 5/1993 | Saito | ................... | F16B 19/1081 411/45 |
| 5,387,065 A * | 2/1995 | Sullivan | .............. | F16B 19/1081 411/48 |
| 5,499,737 A * | 3/1996 | Kraus | ................... | F16B 37/043 138/89 |
| 5,641,255 A * | 6/1997 | Tanaka | ................ | F16B 19/1081 411/45 |
| 6,039,523 A * | 3/2000 | Kraus | ................... | F16B 5/0628 411/48 |
| 6,264,393 B1 * | 7/2001 | Kraus | ................. | B60R 13/0206 24/297 |
| 7,033,121 B2 * | 4/2006 | Kirchen | ................ | F16B 19/008 24/453 |

(Continued)

FOREIGN PATENT DOCUMENTS

| | | |
|---|---|---|
| DE | 3931180 A1 | 4/1990 |
| DE | 102016002583 A1 | 9/2017 |

OTHER PUBLICATIONS

Office Action from corresponding German Patent Application No. 10 2020 114 667.1, dated Sep. 15, 2022 (9 pages).

*Primary Examiner* — Jason W San
(74) *Attorney, Agent, or Firm* — Quarles & Brady LLP

(57) ABSTRACT

A fastener includes a fastening pin and a sleeve component disposed around the fastening pin and movable up and down relative to the fastening pin. The sleeve component includes fixing claws that are able to stretch outward and retract inward. A pin of the fastening pin comprises a small-diameter rod section and an upper large-diameter rod section. When the fixing claws move relative to the pin to abut against an outer surface of the upper large-diameter rod section, the fixing claws stretch outward, and the fastener is in a locked state. When the fixing claws move to the outside of the small-diameter rod section relative to the pin, the fixing claws retract inward, and the fastener is in a release state.

18 Claims, 13 Drawing Sheets

(56) References Cited

U.S. PATENT DOCUMENTS

| | | | | |
|---|---|---|---|---|
| 7,188,393 B2* | 3/2007 | Kawai | ................ | B60R 13/0206 24/297 |
| 7,207,759 B2* | 4/2007 | Kato | ................ | F16B 19/1081 411/509 |
| 7,222,398 B2* | 5/2007 | Koike | ................ | B62D 27/02 24/297 |
| 7,231,696 B2* | 6/2007 | Asano | ................ | B60R 13/0206 24/297 |
| 7,237,995 B2* | 7/2007 | Randez Perez | ..... | F16B 19/1081 411/48 |
| 7,549,199 B2* | 6/2009 | Bugner | ................ | F16B 5/0628 24/297 |
| 7,862,275 B2* | 1/2011 | Jatzke | ................ | B60R 13/0206 411/48 |
| 8,572,818 B2* | 11/2013 | Hofmann | ................ | F16B 21/078 24/297 |
| D701,450 S * | 3/2014 | Ukai | ................ | D8/382 |
| 8,662,807 B2* | 3/2014 | Adachi | ................ | B60R 13/0206 411/49 |
| 8,677,573 B2* | 3/2014 | Lee | ................ | B60R 13/0206 24/297 |
| 8,757,951 B2* | 6/2014 | Rosemann | ................ | F16B 5/065 411/508 |
| 9,145,909 B2* | 9/2015 | Lepper | ................ | F16B 21/082 |
| 10,995,783 B2* | 5/2021 | Dickinson | ................ | F16B 5/0657 |
| 11,346,385 B2* | 5/2022 | Liebelt | ................ | F16B 21/075 |
| 2004/0052612 A1* | 3/2004 | Miura | ................ | F16B 19/004 411/508 |
| 2014/0099156 A1* | 4/2014 | Weber | ................ | B60J 1/1815 403/119 |
| 2015/0135484 A1* | 5/2015 | Leverger | ................ | F16B 13/045 24/292 |
| 2016/0138629 A1* | 5/2016 | Flynn | ................ | F16B 19/1081 411/57.1 |
| 2016/0298668 A1* | 10/2016 | Kanie | ................ | F16B 5/0628 |
| 2017/0198738 A1* | 7/2017 | Najima | ................ | F16B 19/10 |
| 2017/0291558 A1* | 10/2017 | Meyers | ................ | B60R 13/0206 |
| 2018/0100531 A1* | 4/2018 | Flynn | ................ | F16B 21/086 |
| 2020/0141440 A1* | 5/2020 | Liebelt | ................ | F16B 21/086 |
| 2020/0217345 A1* | 7/2020 | Liebelt | ................ | F16B 21/075 |

* cited by examiner

FASTENER

CROSS REFERENCES TO RELATED APPLICATIONS

This application claims priority to Chinese Application Serial No. 201910514207.3, filed Jun. 14, 2019, the contents of which are incorporated herein by reference in their entirety.

TECHNICAL FIELD

The present application relates to the technical field of fasteners, and more particularly, to fasteners for fastening automobile interior trim panels.

BACKGROUND

Automobile interior trim panels can not only improve the aesthetics in interiors of automobiles, but also provide a certain degree of protection to passengers in an event of a collision. Automobile interior trim panels are often fixed to inner sheet metals of an automobile through fasteners. However, in automobile modification and maintenance, the automobile interior trim panels might need to be detached from the inner sheet metals. In this situation, the fasteners need to be pulled out of the interior trim panels and the inner sheet metals. Therefore, the fasteners for the automobile interior trim panels should meet the use requirements of ensuring both secure fastening and easy pulling-out.

SUMMARY OF THE INVENTION

One of objects of the present application is to provide an improved fastener, which can not only fasten an automobile interior trim panel and an automobile inner sheet metal together firmly, but also be smoothly removed from the automobile interior trim panel and the automobile inner sheet metal without destroying the original structure of the fastener.

In order to achieve object as set forth above, the present application provides a fastener comprising a fastening pin and a sleeve component. The fastening pin comprises a head and a pin connected to the head. The pin comprises an upper large-diameter rod section and a small-diameter rod section. The upper large-diameter rod section is closer to the head than the small-diameter rod section. The small-diameter rod section has a smaller cross section area than the upper large-diameter rod section.

The sleeve component comprises a sleeve main body and at least two stretchable and retractable fixing claws. The sleeve component has a through hole inside which the pin of the fastening pin is inserted into. The sleeve main body is configured with at least two windows. The fixing claws are configured to be able to stretch outward and retract inward on the sleeve main body through the respective windows such that the fixing claws can be in a release position and a locked position.

The fixing claws are configured to be (i) in the release position when the fixing claws are in a free state or are located outside the small-diameter rod section of the fastening pin, and (ii) in the locked position when the fixing claws abut against the upper large-diameter rod section of the fastening pin.

The fastener as set forth above further comprises a lower large-diameter rod section, and the small-diameter rod section is located between the upper large-diameter rod section and the lower large-diameter rod section.

The fastener as set forth above is locked on a fixed plate when the fixing claws are in the locked position and are released from the fixed plate when the fixing claws are in the release position.

In the fastener as set forth above, the fixing claws comprise first ends which are fixed to the bottom edges of the respective windows and second ends which are free ends.

In the fastener as set forth above, the pin further comprises a first positioning region and a second positioning region that are both disposed on an outer surface of the lower large-diameter rod section, wherein the first positioning region is spaced apart from the second positioning region along the lengthwise of the lower large-diameter rod section, and the first positioning region is further away from the head than the second positioning region.

The sleeve component further comprises a sleeve positioning member which is disposed on the inner wall of the sleeve main body and is able to engage the first positioning region and the second positioning region.

When the sleeve positioning member is engaged in the first positioning region, the fixing claws are located outside the small-diameter rod section, and when the sleeve positioning member is engaged in the second positioning region, the fixing claws abut against the upper large-diameter rod section.

In the fastener as set forth above, the small-diameter rod section is located adjacent to the upper large-diameter rod section along the lengthwise of the fastening pin, and transitions to the upper large-diameter rod section through a conical surface.

In the fastener as set forth above, the fixing claws are configured with a bevel near the second ends.

In the fastener as set forth above, the first positioning region and the second positioning region are both grooves disposed around an outer periphery of the lower large-diameter rod section; and the sleeve positioning member is a protrusion annularly disposed on an inner wall of the sleeve main body.

In the fastener as set forth above, the sleeve component further comprises an annular fixing member which is disposed at an end of the sleeve main body proximate to the head of the fastening pin and extends outward around an outer surface of the sleeve main body.

The fastener as set forth above further comprises an annular sealing member disposed around outside the annular fixing member.

The fixing claws on the sleeve component of the fastener of the present application are configured to be able to stretch outward and retract inward. The pin of the fastening pin is configured with an upper large-diameter rod section and a small-diameter rod section. When the fixing claws abut against an outer surface of the upper large-diameter rod section, the fixing claws stretch outward to firmly fasten the automobile interior trim panel and the automobile inner sheet metal. When an upward pulling force is exerted on the fastening pin, the fastening pin moves upward relative to the sleeve component to enable the fixing claws to be located outside the small-diameter rod section where the fixing claws retracts inward. Accordingly, the fastener engaged with the automobile interior trim panel can be smoothly removed from the automobile inner sheet metal without destroying the original structure of the fastener.

DETAILED DESCRIPTION OF EMBODIMENTS

Figure 1A:
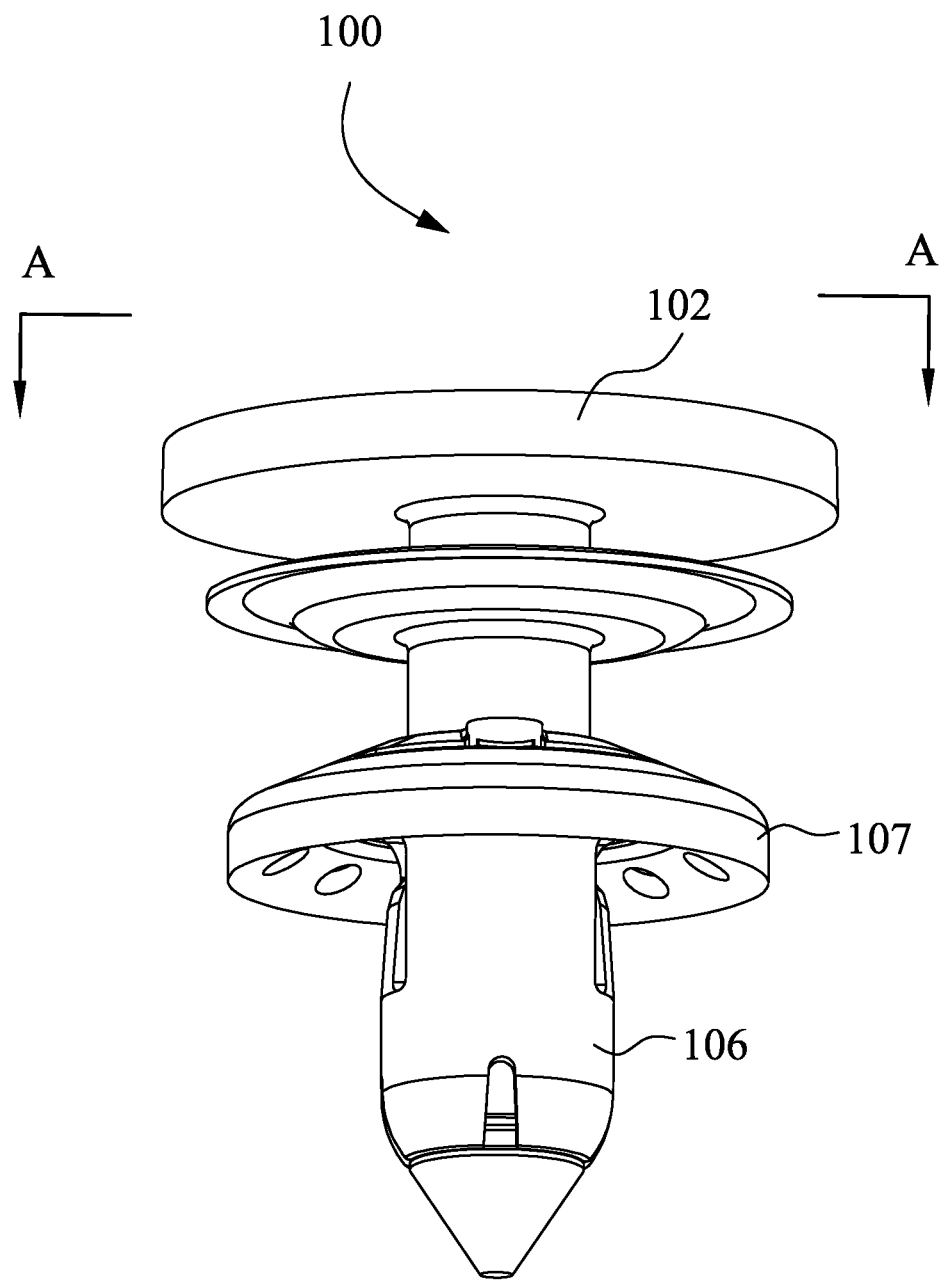
FIG. 1A is a perspective view of a fastener according to an embodiment of the present application in an initial state.

Particular embodiments of the present application are described below with reference to the accompanying drawings which constitute part of this description. It should be understood that although the terms such as "top", "bottom", "upper", "lower", "left", and "right" indicating directions in the present application are used to describe various exemplary structural parts and elements in the present application, these terms used herein are merely used for ease of description and are determined based on the exemplary orientation shown in the accompanying drawings. Since the embodiments disclosed in the present application can be arranged in different directions, these terms indicating directions are only illustrative and should not be considered as limitations. If possible, the same or similar reference numerals used in the present application refer to the same components.

Figure 1B:
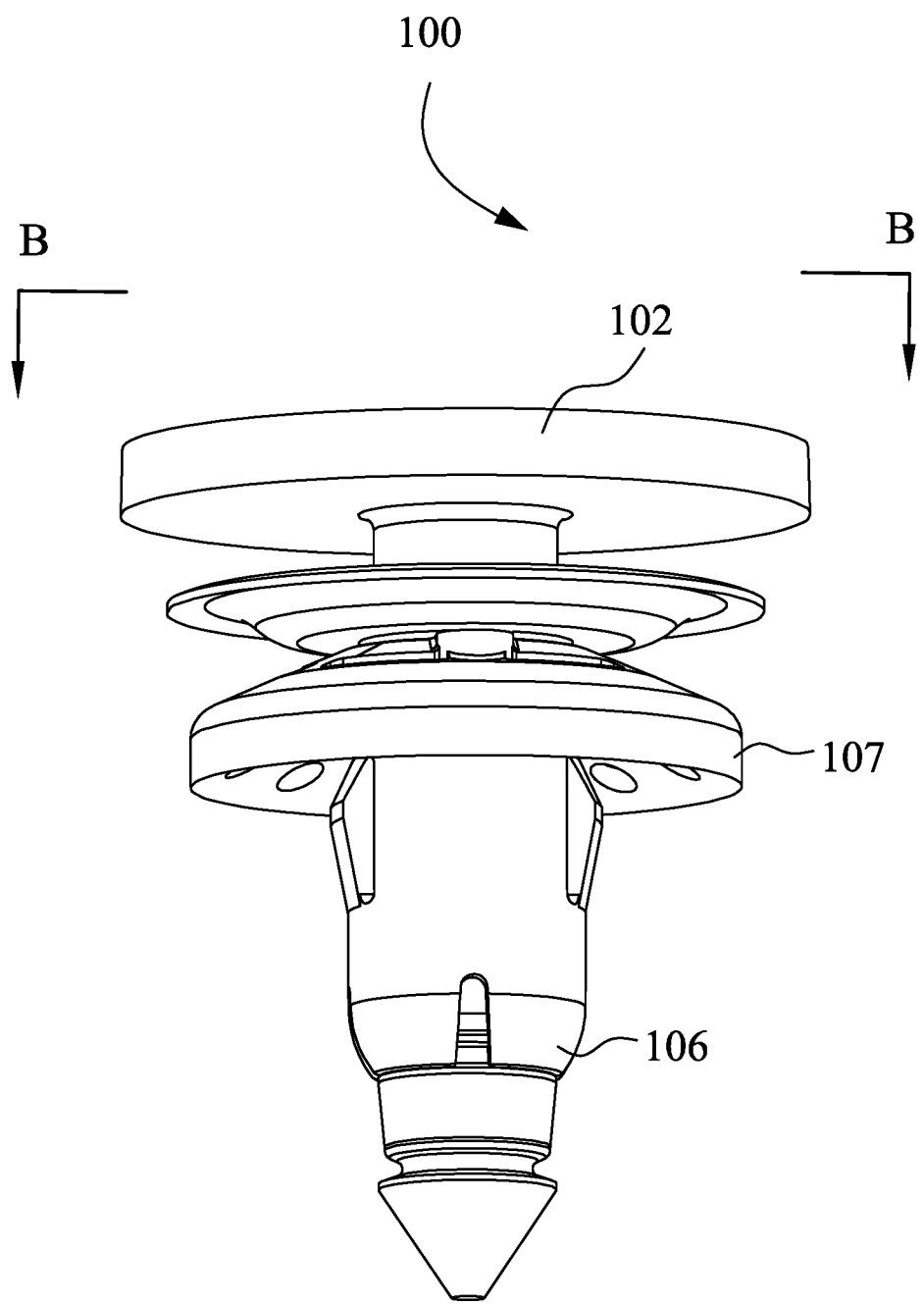
FIG. 1B is a perspective view of the fastener according to an embodiment of the present application in a locked state.

FIG. 1A is a perspective view of a fastener 100 according to an embodiment of the present application in an initial state; and FIG. 1B is a perspective view of the fastener 100 according to an embodiment of the present application in a locked state. As shown in FIGS. 1A and 1B, the fastener 100 comprises a fastening pin 102, a sleeve component 106 and an annular sealing member 107. The sleeve component 106 is disposed around the fastening pin 102. The annular sealing member 107 is fixed to a top of the sleeve component 106 and is disposed around the fastening pin 102 along with the sleeve component 106 such that the annular sealing member 107 and the sleeve component 106 are movable up and down relative to the fastening pin 102 as a unit. When the sleeve component 106 and the annular sealing member 107 move to a release position as shown in FIG. 1A, the fastener 100 is in a release state (i.e., the initial state of the fastener 100). When the sleeve component 106 and the annular sealing member 107 move to a locked position as shown in FIG. 1B, the fastener 100 is in the locked state.

Figure 2:
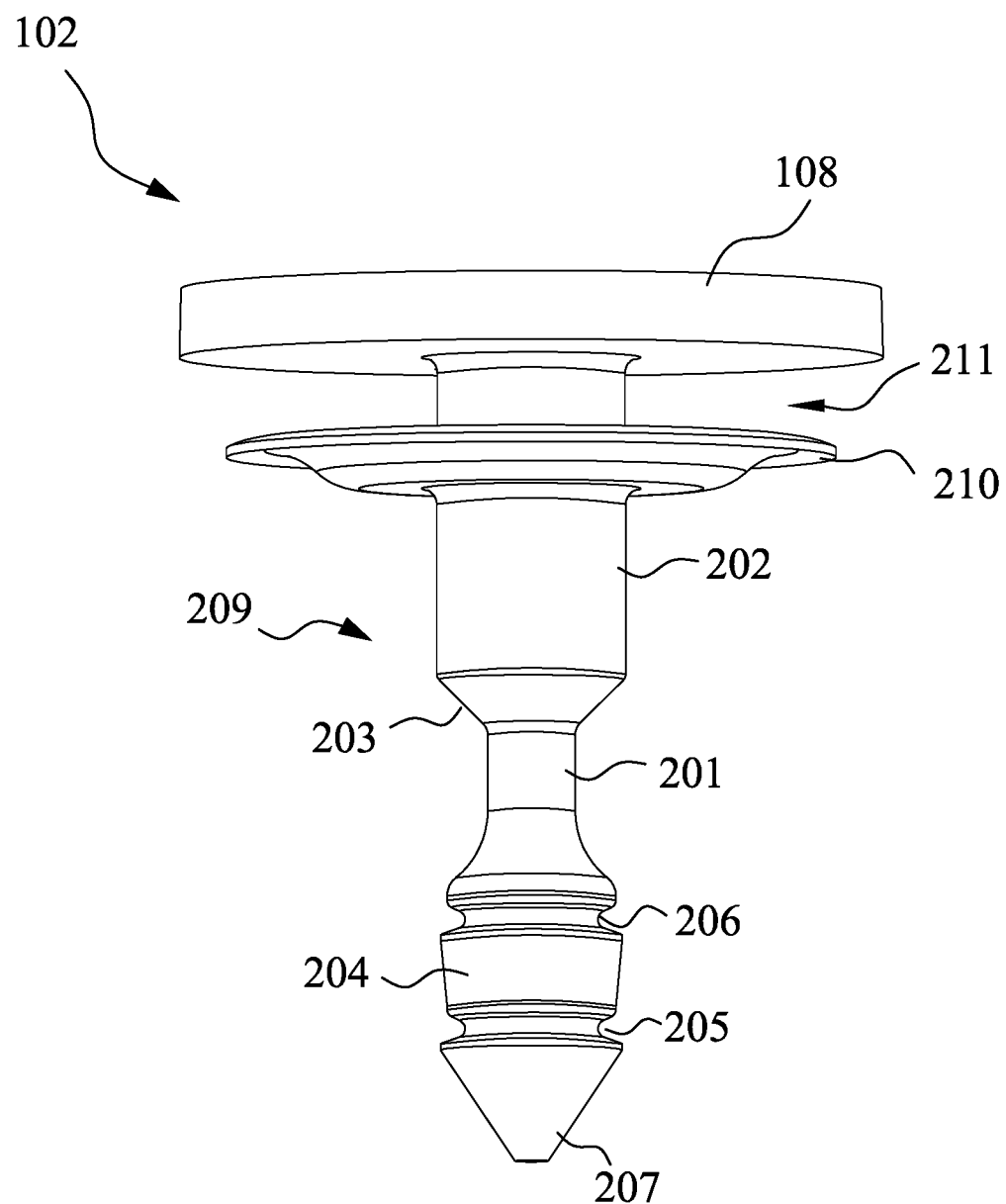
FIG. 2 is a perspective view of a fastening pin in FIG. 1A.

FIG. 2 is a perspective view of the fastening pin 102 in FIG. 1A. As shown in FIG. 2, the fastening pin 102 comprises a head 108, a support 210 and a pin 209. The whole head 108 is in the shape of a circular flat plate. The pin 209 is rod-shaped and extends downward in a direction perpendicular to the head 108. The pin 209 has one end fixedly connected to the middle of a bottom surface of the head 108 and an opposite end having a substantially conical tip 207. The support 210 located below the head 108 is fixed to the pin 209 and extends outward around an outer periphery of the pin 209. The whole support 210 is substantially dish-shaped and has an outer edge slightly raised upward. The support 210 is spaced apart from the head 108 to form a receiving space 211 for receiving a movable plate 601 (see FIG. 6A). In this embodiment, the movable plate 601 is an automobile interior trim panel.

The pin 209 comprises a plurality of sections, including an upper large-diameter rod section 202, a small-diameter rod section 201, and a lower large-diameter rod section 204. The small-diameter rod section 201 is located between the upper large-diameter rod section 202 and the lower large-diameter rod section 204, and has a smaller cross-sectional area than both of the upper large-diameter rod section 202 and the lower large-diameter rod section 204. The upper large-diameter rod section 202 extends from a bottom surface of the head 108 by a distance below the support 210. The lower large-diameter rod section 204 is close to and above the tip 207 of the pin. The upper large-diameter rod section 202 transitions to the small-diameter rod section 201 through a conical surface 203. There is also a smooth transition between the lower large-diameter rod section 204 and the small-diameter rod section 201.

The fastening pin 102 is also provided with a first positioning region 205 and a second positioning region 206 for positioning the sleeve component 106. The first positioning region 205 and the second positioning region 206 each is an annular groove disposed around an outer periphery of the lower large-diameter rod section 204. The first positioning region 205 is located at a bottom of the lower large-diameter rod section 204, and the second positioning region 206 is located at a top of the lower large-diameter rod section 204.

Figure 3A:
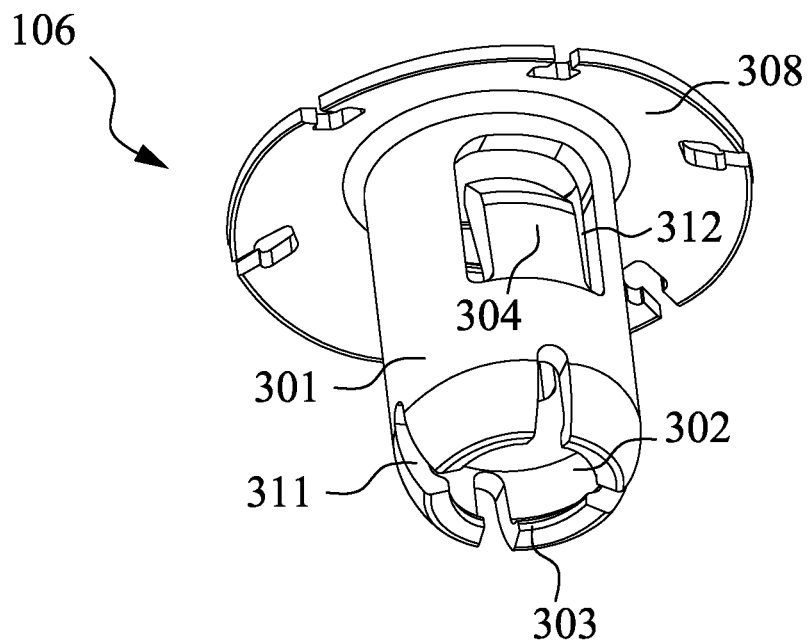
FIG. 3A is a perspective view of a sleeve component in the initial state of FIG. 1A.
Figure 3B:
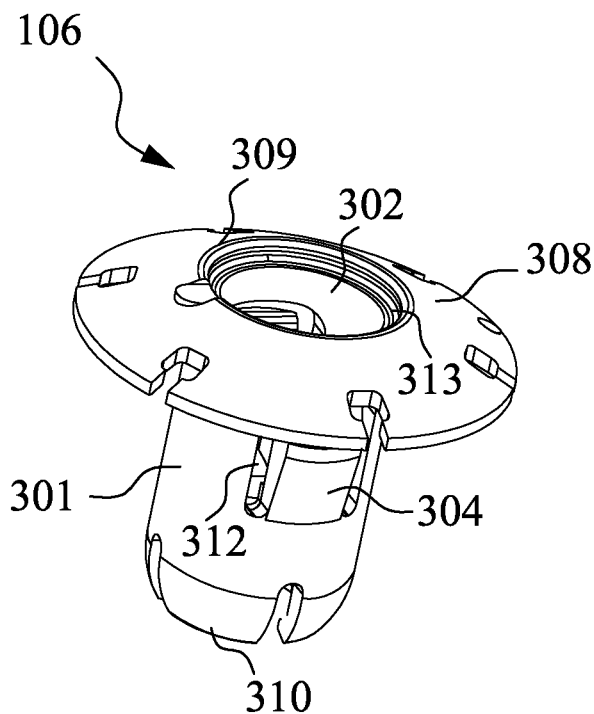
FIGS. 3B and 3C are perspective views of the sleeve component in the locked state of FIG. 1B from different perspectives.
Figure 3C:
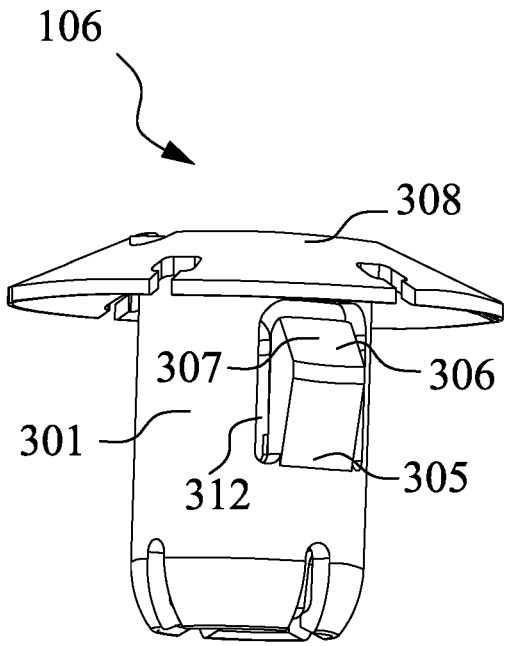

FIG. 3A is a perspective view of the sleeve component 106 in the state of FIG. 1A; and FIGS. 3B and 3C are perspective views of the sleeve component 106 in the state of FIG. 1B from different perspectives. As shown in FIGS. 3A to 3C, the whole sleeve component 106 is mushroom-shaped, and comprises a sleeve main body 301 and an annular fixing member 308. The sleeve main body 301 is substantially cylindrical, and has a through hole 302 inside. The annular fixing member 308 is located at the top of the sleeve main body 301 and extends outward and obliquely downward around the top of the sleeve main body 301 to form a mushroom head of the mushroom-shaped sleeve component 106. An engaging groove 313 is disposed where the sleeve main body 301 and the annular fixing member 308 join to facilitate the annular sealing member 107 engaging the outer periphery of the annular fixing member 308. The engaging groove 313 is located near a top of the sleeve component 106 around an inner wall of the sleeve main body 301 and is annular in shape. Since the through hole 302 runs through the entire sleeve component 106, the entire sleeve component 106 can be disposed around the pin 209 of the fastening pin 102 and move up and down relative to the pin 209.

The sleeve main body 301 is configured with two opposite windows 312 at a same level. The two windows 312 are symmetrical to each other with respect to a central axis of the sleeve main body 301. Each window 312 cuts through the sleeve main body 301 to form an opening having a substantially rectangular cross section. A fixing claw 304 extends upward from a bottom edge of each window 312. The fixing claw 304 has a width slightly smaller than that of the bottom edge of the window 312 and a height slightly smaller than that of the window 312 such that the fixing claw 304 can be substantially housed in a corresponding window 312. The whole fixing claw 304 is in the shape of a flexible sheet with a certain thickness. The fixing claw 304 comprises two ends including a first end 305 which is a fixed end connected to the bottom edge of the window 312 and a second end 306 which is a free end. As shown in FIG. 3C, the fixing claw 304 is further configured with a bevel 307 near the second end 306, which is inclined outward and downward from the second end 306. Hence, the fixing claw 304 has the smallest thickness at the ends and a largest thickness near the middle. The fixing claw 304 is not connected to the sleeve main body 301 except for the first end 305. Such a configuration enables the bottom edge of the window 312 to serve as the fixed end of the corresponding fixing claw 304, and in turn enables the fixing claw 304 to stretch outward and retract inward relative to inner and outer surfaces of the sleeve main body 301 about the fixed end. As shown in FIG. 3A, the second end 306 of the fixing claw 304 retracts toward the inner surface of the sleeve main body 301 and thus the fixing claw 304 is in the release position when the fastener 100 is in the release state. As shown in FIGS. 3B and 3C, the second end 306 of the fixing claw 304 stretches out toward the outer surface of the sleeve main body 301 and thus the fixing claw 304 is in the locked position when the fastener 100 is in the locked state. The sleeve component is in the state as shown in FIG. 3 and the fixing claw 304 is in the release position when the fixing claw is in a free state with no pressure exerting on the fixing claw 304.

As shown in FIG. 3A, the sleeve component 106 is further configured with a sleeve positioning member 303 at a bottom of the sleeve main body 301. The sleeve positioning member 303 has a protrusion annularly disposed on the inner surface of the sleeve main body 301. The bottom of the sleeve main body 301 is uniformly configured with a plurality of cutting openings 311, which divide the sleeve positioning member 303 into a plurality sub-positioning members spaced apart from one other. The configuration of the plurality of cutting openings 311 facilitates the bottom of the sleeve component 106 flexibly expanding outward, thereby facilitating the sleeve component 106 moving up and down relative to the fastening pin 102.

Figure 4A:
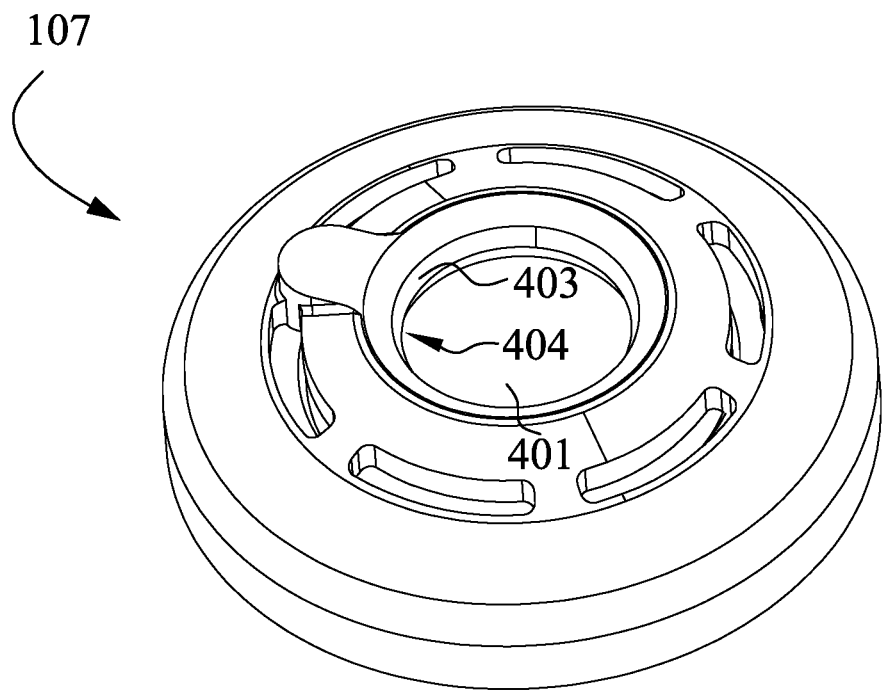
FIGS. 4A and 4B are perspective views of an annular sealing member in FIG. 1A from different perspectives.
Figure 4B:
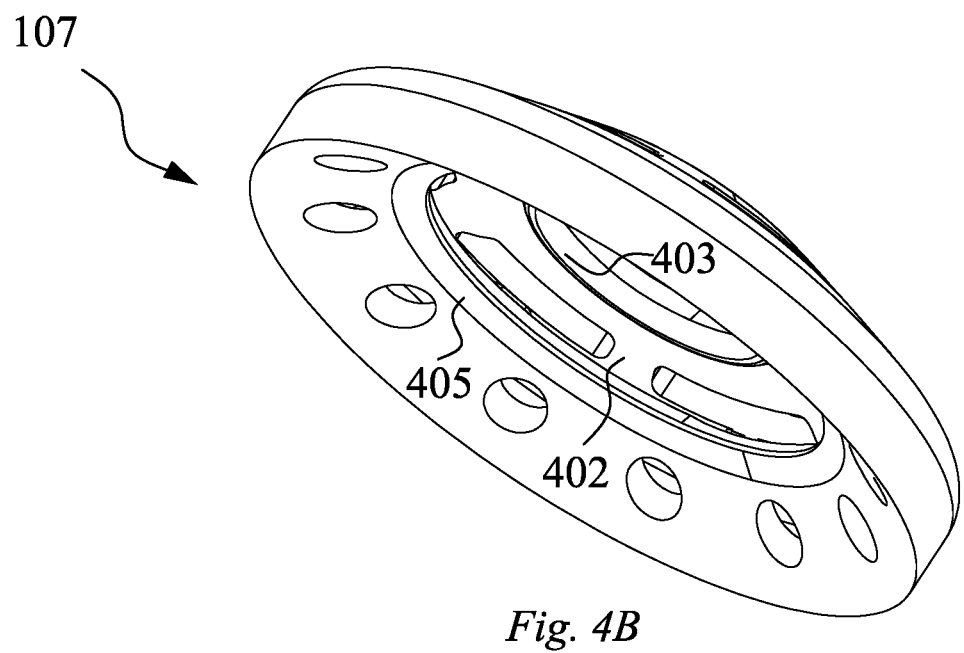

FIGS. 4A and 4B are perspective views of the annular sealing member 107 in FIG. 1A from different perspectives. The whole annular sealing member 107 is disc-shaped and has a periphery slightly inclined downward from its center. The annular sealing member 107 is configured with a mounting hole 401 in the middle. An annular mounting groove 402 is provided around the mounting hole 401 for engaging the annular fixing member 308 located at the top of the sleeve component 106 such that the mounting hole 401 houses the annular fixing member 308. The annular sealing member 107 further comprises an upper mounting part 403 and a lower mounting part 405 which are both annular ledges disposed around the mounting hole 401. The upper mounting part 403 is disposed on a top of the annular mounting groove 402 and has an outer surface 404 defining the boundary of the mounting hole 401. The lower mounting part 405 is disposed on a bottom of the annular mounting groove 402. The configuration of the annular mounting groove 402 enables the annular sealing member 107 to be fitted and engaged with the annular fixing member 308 located at the top of the sleeve component 106. The annular sealing member 107 and the sleeve component 106 are made of two different kinds of plastics through an over-molding process, and the annular sealing member 107 has better flexibility than the annular fixing member 308.

Figure 5A:
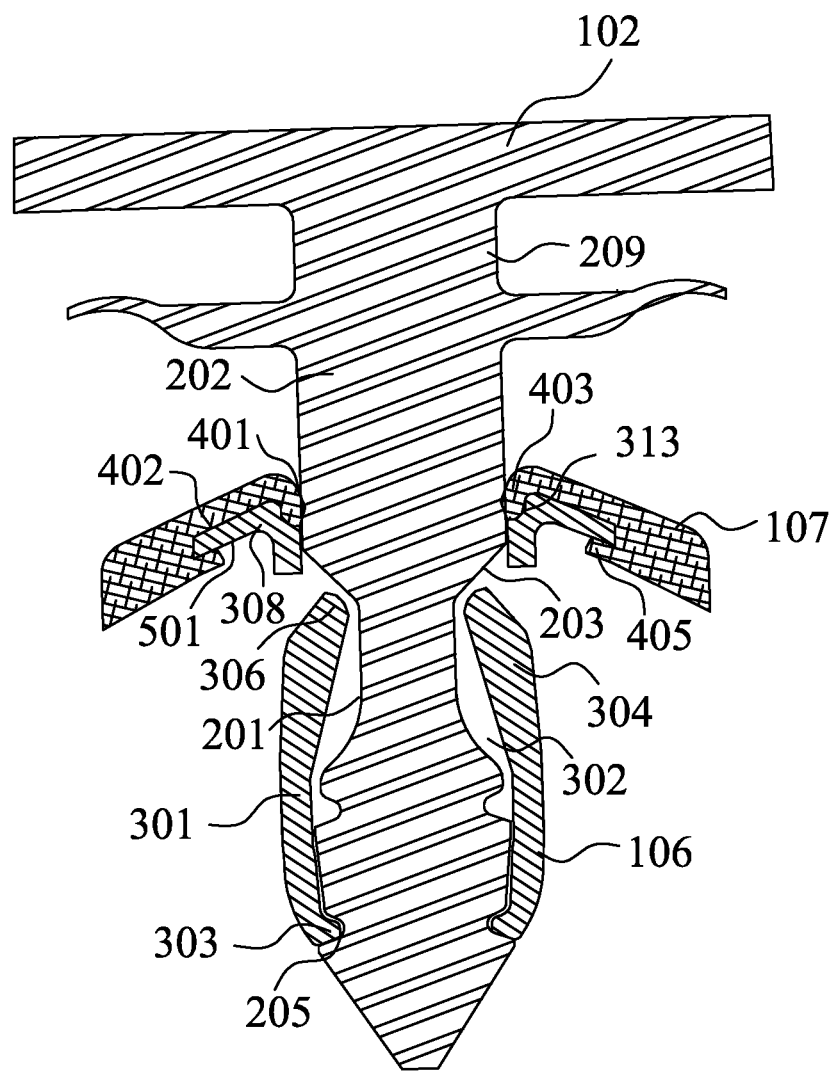
FIG. 5A is a cross-sectional view of the fastener shown in FIG. 1A taken along line A-A.
Figure 5B:
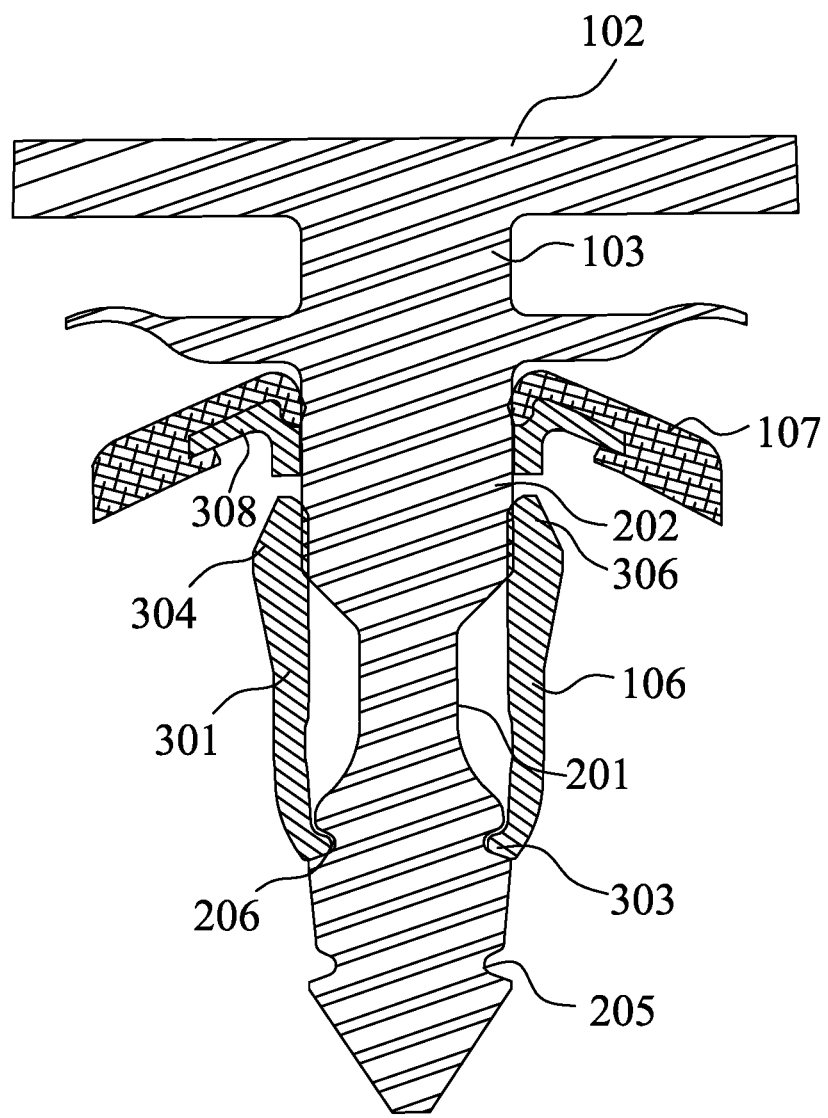
FIG. 5B is a cross-sectional view of the fastener shown in FIG. 1B taken along line B-B.

FIG. 5A is a cross-sectional view of the fastener 100 shown in FIG. 1A along line A-A; and FIG. 5B is a cross-sectional view of the fastener 100 shown in FIG. 1B along line B-B. As shown in FIGS. 5A and 5B, the sleeve component 106 is disposed around outside the pin 209 of the fastening pin 102 through the through hole 302, the annular sealing member 107 is disposed around outside the pin 209 of the fastening pin 102 through the mounting hole 401, and the annular sealing member 107 is engaged the top of the sleeve component 106. The annular fixing member 308 on the top of the sleeve component 106 is engaged in the annular mounting groove 402 provided in the annular sealing member 107, the upper mounting part 403 of the annular sealing member 107 is engaged in the engaging groove 313 located near the top of the sleeve component 106, and the lower mounting part 405 of the annular sealing member 107 abuts against a bottom surface 501 near the outer periphery of the annular fixing member 308, and therefore, the annular sealing member 107 engages the outer surface of the annular fixing member 308 to keep fixed to the annular fixing member 308.

As shown in FIG. 5A, the sleeve positioning member 303 at the bottom of the sleeve component 106 is engaged in the first positioning region 205 of the pin 209 when the fastener 100 is in the initial state. As shown in FIG. 5B, the sleeve positioning member 303 at the bottom of the sleeve component 106 is engaged in the second positioning region 206 of the pin 209 when the fastener 100 is in the locked state. With reference to both FIGS. 5A and 5B, it can be seen that both the mounting hole 401 of the annular sealing member 107 and the inner surface at the top of the sleeve component 106 abut against the outer surface of the upper large-diameter rod section 202 regardless of whether the sleeve positioning member 303 is engaged in the first positioning region 205 or the second positioning region 206.

As shown in FIG. 5A, the free end (i.e., the second end 306) of the fixing claws 304 are located where the small-diameter rod section 201 and the conical surface 203 join together when the sleeve positioning member 303 is engaged in the first positioning region 205. In this state, since the diameter of the small-diameter rod section 201 is sufficiently small, there is no contact between the pin 209 and the second ends 306 of the fixing claws 304. Accordingly, the pin 209 does not exert a pressure on the second ends 306 of the fixing claws 304. Hence, the outer surfaces of the fixing claws 304 retract inward relative to the outer surface of the sleeve main body 301 to make the fixing claw 304 in the release position, and accordingly, the fastener 100 is in the release state. In another embodiment, the diameter of the small-diameter rod 201 may be such designed that the second ends 306 of the fixing claws 304 abut against the outer surface of the small-diameter rod section 201 when the sleeve positioning member 303 is engaged in the first positioning region 205. In this design, the outer surfaces of the fixing claws 304 may be flush with the outer surface of the sleeve main body 301, or may retract inward relative to the outer surface of the sleeve main body 301.

As shown in FIG. 5B, the free ends (i.e., the second ends 306) of the fixing claws 304 abut against the outer surface of the upper large-diameter rod section 202 when the sleeve positioning member 303 is engaged in the second positioning region 206 located above the first positioning region 205. In this state, since the diameter of the upper large-diameter rod section 202 is sufficiently large, the second ends 306 of the fixing claws 304 stretch outward with the pressure exerted by the upper large-diameter rod section 202. Accordingly, the outer surfaces of the fixing claws 304 protrude outward beyond the outer surface of the sleeve main body 301. Therefore, the fixing claws 304 are in the locked position, and the fastener 100 is in the locked state.

Figure 6A:
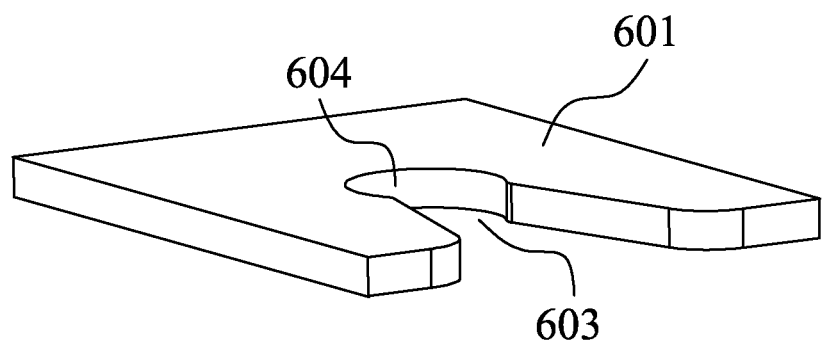
FIG. 6A is a movable plate that can be locked between a head and a support of the fastener of FIG. 1B.

FIG. 6A shows a movable plate 601 that can be locked between a head 108 and a support 210 of the fastener 100. In this embodiment, the movable plate 601 is an automobile interior trim panel. As shown in FIG. 6A, the automobile interior trim panel comprises a sliding groove 603. The sliding groove 603 has one open end which is gradually narrowed toward an opposite end along a lengthwise of the sliding groove 603. The opposite end of the sliding groove 603 has an arc-shaped end surface 604 for engaging a portion of the pin 209 between the head 108 and the support 210.

Figure 6B:
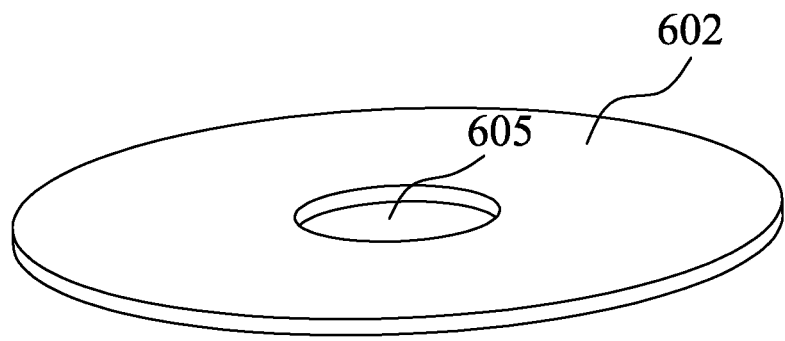
FIG. 6B is a fixed plate that can be locked at the sleeve component of the fastener of FIG. 1B.

FIG. 6B shows a fixed plate 602 that can be locked at a position of the sleeve component 106 of the fastener 100. In this embodiment, the fixed plate 602 is an automobile inner sheet metal. As shown in FIG. 6B, the automobile inner sheet metal comprises an insertion hole 605 which is a circular opening for engaging the sleeve component 106 that is disposed around outside the pin 209.

In order to fasten the automobile interior trim panel (i.e., the movable plate 601) to the automobile inner sheet metal (i.e., the fixed plate 602), this embodiment provides a fastener 100 in the initial state (i.e., the release state) in a first step. After the receiving space 211 formed between the support 210 and the head 108 is in registration with the sliding groove 603 of the automobile interior trim panel, the fastener 100 slides into the sliding groove 603 until the portion of the pin 209 between the support 210 and the head 108 abuts against the arc-shaped end surface 604 at the end of the sliding groove 603. Next, the pin 209 of the fastener 100 which engages the automobile interior trim panel is operated to be in registration of the insertion hole 605 in the automobile inner sheet metal such that the fastener 100 can be inserted into the automobile inner sheet metal from the tip 207 of the pin 209 until the annular sealing member 107 disposed around the top of the sleeve component 106 abuts against the upper surface of the automobile inner sheet metal to block the further insertion of the fastener 100.

Figure 7A:
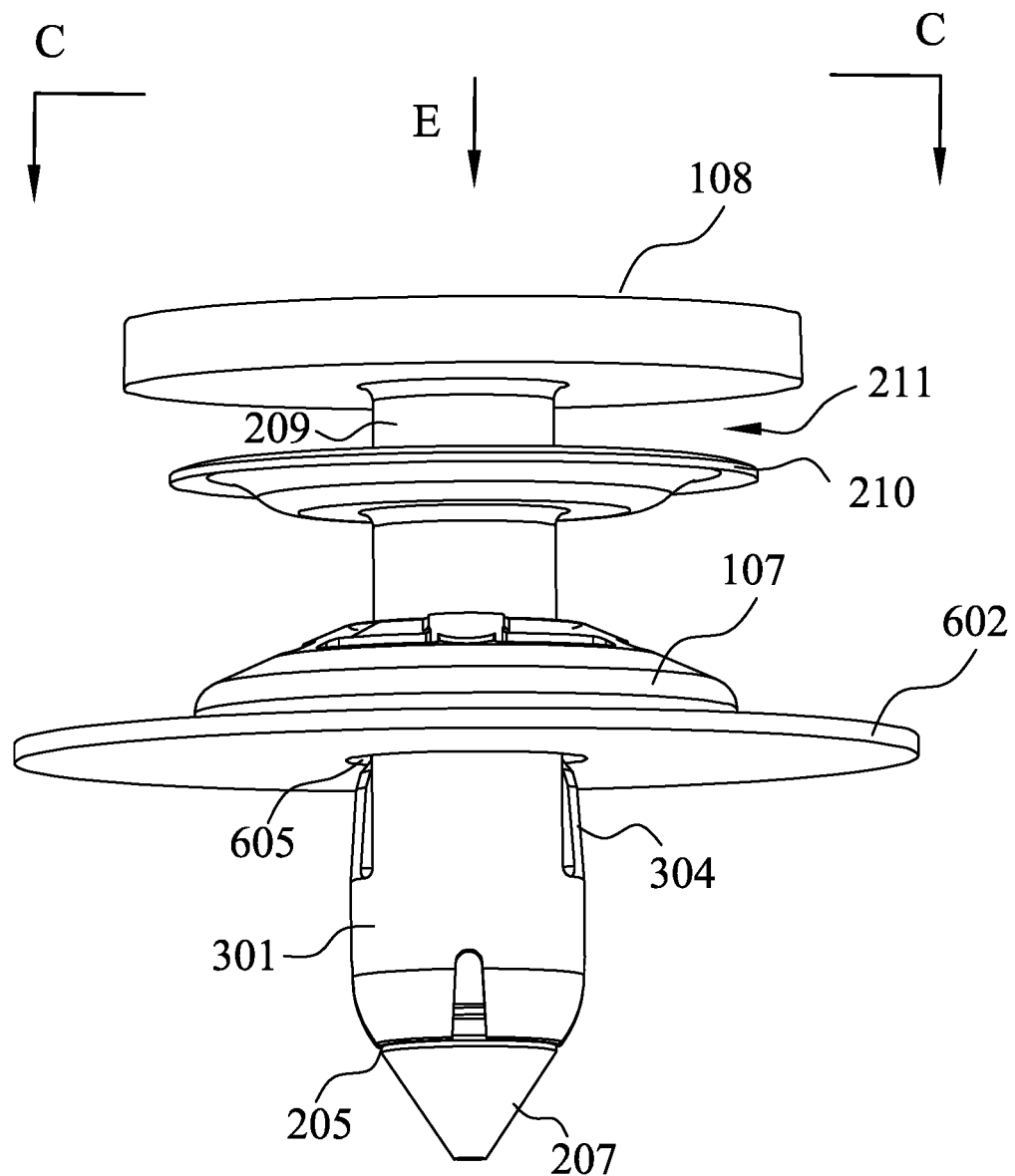
FIG. 7A is a perspective view illustrating the fastener shown in FIG. 1A being inserted into the fixed plate.
Figure 7B:
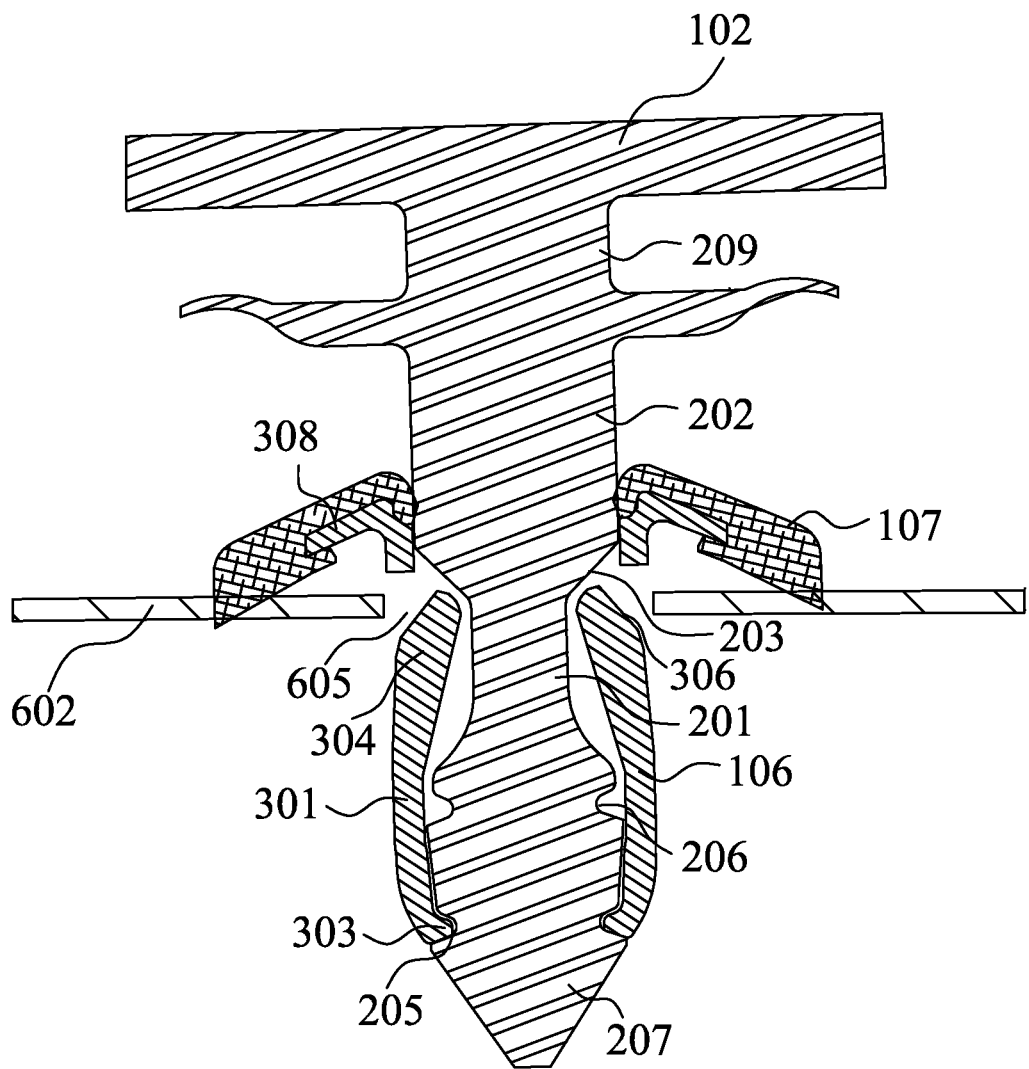
FIG. 7B is a cross-sectional view of the fastener and the fixed plate of FIG. 7A taken along line C-C.

FIG. 7A is a perspective view illustrating the fastener 100 shown in FIG. 1A being inserted into the fixed plate 602, and FIG. 7B is a cross-sectional view of the fastener 100 and the fixed plate 602 of FIG. 7A along line C-C. FIGS. 7A and 7B omit the automobile interior trim panel (i.e., the movable plate 601) received at the upper portion of the fastener 100, but only show the insertion of the fastener 100 into the automobile inner sheet metal (i.e., the fixed plate 602). As shown in FIGS. 7A and 7B, the inner diameter of the insertion hole 605 in the automobile inner sheet metal is slightly larger than the outer diameter of the sleeve main body 301 of the sleeve component 106, and the fixing claws 304 are in the release position where the outer surfaces of the fixing claws 304 retract inward from the outer surface of the sleeve main body 301 when the fastener 100 is in the initial state. Therefore, when the fastener 100 is inserted into the automobile inner sheet metal, the fixing claws 304 of the fastener 100 are able to smoothly pass through the insertion hole 605 of the automobile inner sheet metal without interacting with the insertion hole 605. Since the outer diameter of the annular sealing member 107 is much larger than the inner diameter of the insertion hole 605 and the annular sealing member 107 is inclined downward from the middle to the periphery, the lower surface at the periphery of the annular sealing member 107 just abuts against the upper surface of the automobile inner sheet metal when the insertion hole 605 in the automobile inner sheet metal passes through the fixing claws 304 on the fastener 100, preventing the fastener 100 from further inserting into the insertion hole 605.

When the head 108 of the fastener 100 shown in FIG. 7A is further pressed downward as shown by arrow E, the annular sealing member 107 keeps abutting against the upper surface of the automobile inner sheet metal without changing the position relative to the automobile inner sheet metal. Since the sleeve component 106 is movable up and down relative to the pin 209 as a unit with the annular sealing member 107 disposed at the top of the sleeve component 106, the sleeve component 106 also keeps the position relative to the automobile inner sheet metal unchanged. However, when the head 108 of the fastener 100 shown in FIG. 7A is further pressed downward as shown by arrow E, the fastening pin 102 moves downward relative to the sleeve component 106 with the downward pressure. During the downward movement of the pin 209 of the fastening pin 102, the sleeve positioning member 303 at the bottom of the sleeve component 106 gradually moves upward from the lower first positioning region 205 to the upper second positioning region 206 relative to the pin 209, and finally is engaged in the second positioning region 206. In the meanwhile, the second ends 306 of the fixing claws 304 gradually move upward from the small-diameter rod section 201 to abut against the conical surface 203 between the small-diameter rod section 201 and the upper large-diameter rod section 202, and further gradually move upward to abut against the outer surface of the upper large-diameter rod section 202 with the guidance of the conical surface 203. The conical surface 203 plays a transitional role between the small-diameter rod section 201 and the upper large-diameter rod section 202, which enables the fixing claws 304 located outside the small-diameter rod section 201 to smoothly move upward to abut against the outer surface of the upper large-diameter rod section 202. When the fixing claws 304 on both the left and right sides of the fastener 100 abut against the outer surface of the upper large-diameter rod section 202, the two fixing claws 304 respectively stretch outward and the fastener 100 is in the locked state.

Figure 8A:
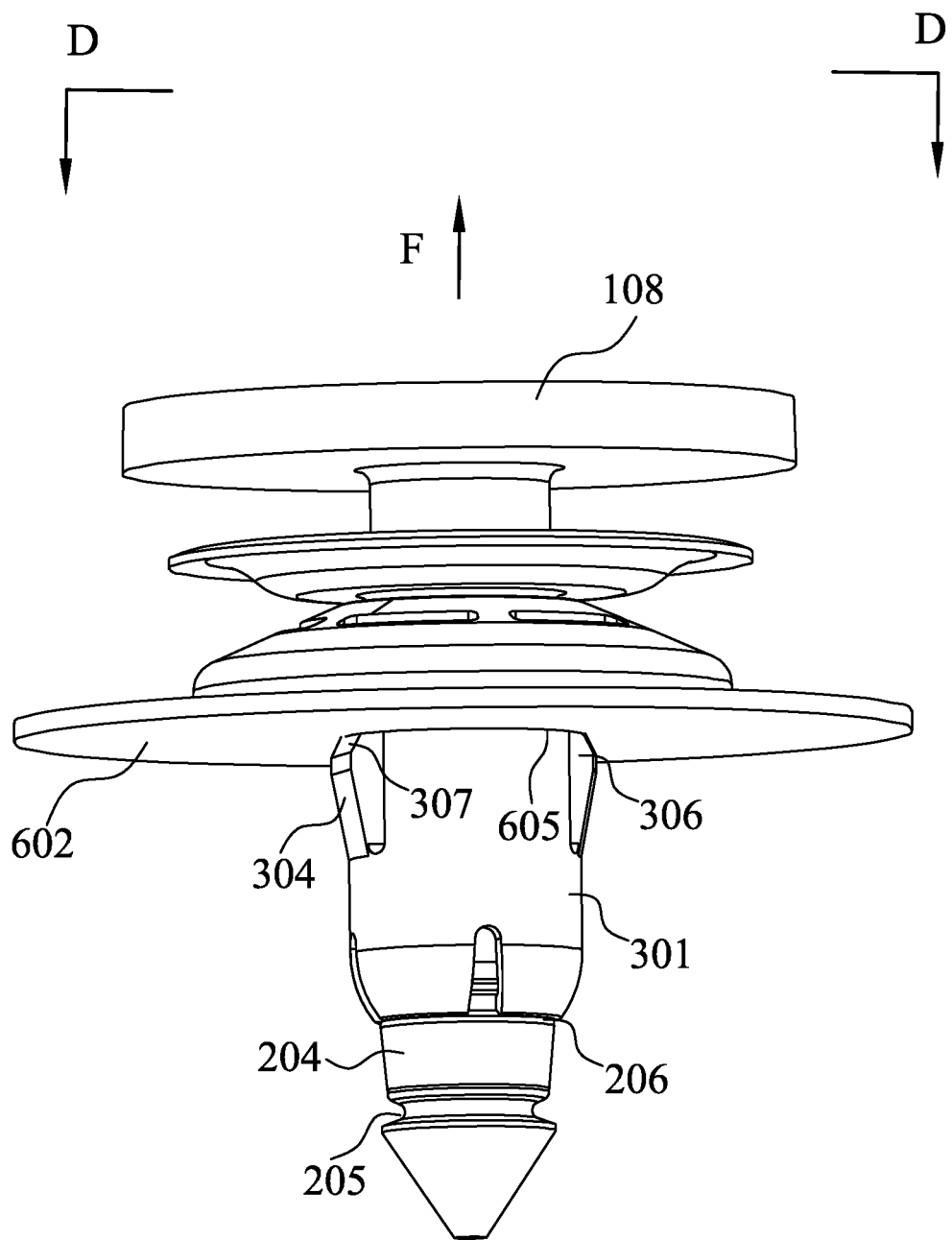
FIG. 8A is a perspective view illustrating the fastener shown in FIG. 7A locking the fixed plate.
Figure 8B:
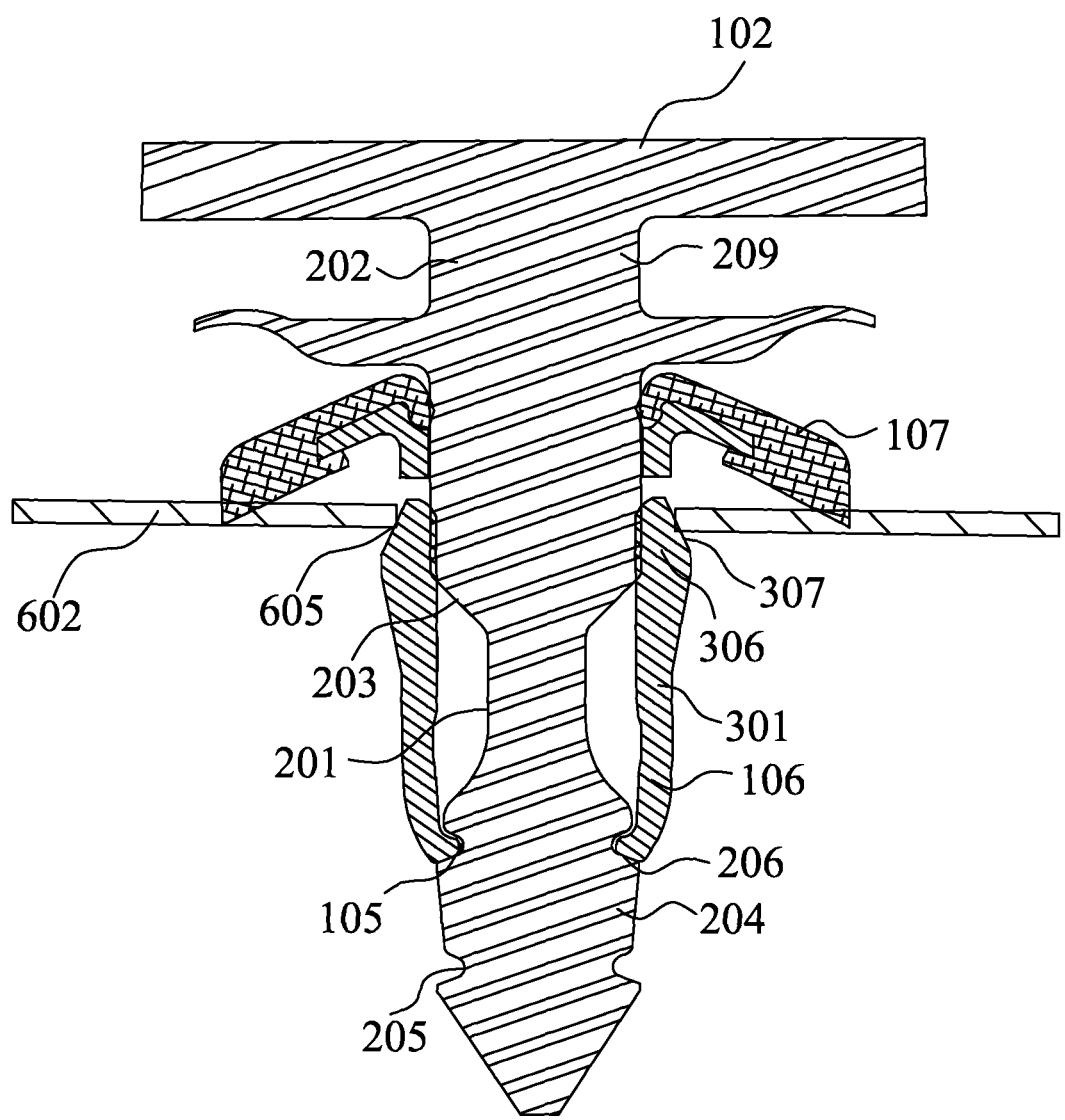
FIG. 8B is a cross-sectional view of the fastener and the fixed plate of FIG. 8A taken along line D-D.

FIG. 8A is a perspective view illustrating the fastener 100 shown in FIG. 7A locks the fixed plate 602, and FIG. 8B is a cross-sectional view of the fastener 100 and the fixed plate 602 of FIG. 8A along line D-D. FIGS. 8A and 8B also omit the automobile interior trim panel (i.e., the movable plate 601) received at the upper portion of the fastener 100, but only show that the fastener 100 fastens the automobile inner sheet metal (i.e., the fixed plate 602). As shown in FIGS. 8A and 8B, since the inner diameter of the insertion hole 605 in the automobile inner sheet metal (i.e., the fixed plate 602) is only slightly larger than the outer diameter of the sleeve main body 301, the bevels 307 near the second ends 306 of the fixing claws 304 will be engaged with the inner surface of the insertion hole 605 when the fixing claws 304 stretch outward with abutting against the outer surface of the upper large-diameter rod section 202, thus blocking the automobile inner sheet metal from sliding downward. Accordingly, the automobile inner sheet metal is clocked on the fastener 100 such that the automobile interior trim panel and the automobile inner sheet metal are fixed together. When the fastener 100 locks the fixed plate 602, the inner surface of the annular sealing member 107 is closely fitted to the outer surface of the upper large-diameter rod section 202 and the periphery of the annular sealing member 107 abuts against the upper surface of the automobile inner sheet metal, thereby, the annular sealing member 107 can serve as a seal to prevent dust, water, etc. from entering into the inside of the automobile inner sheet metal through the insertion hole 605.

When it is necessary to separate the automobile interior trim panel from the automobile inner sheet metal, an upward pulling force F can be exerted on the head 108 of the fastener 100 shown in FIG. 8A, which, in turn, is exerted on the whole fastening pin 102. When an upward pulling force F is exerted on the head 108 of the fastener 100, the sleeve component 106 and the annular sealing member 107 disposed at the top thereof can still keep the position relative to the automobile inner sheet metal unchanged since the fixing claws 304 are engaged with the automobile inner sheet metal (i.e., the fixed plate 602), while the fastening pin 102 moves upward relative to the sleeve component 106 with the upward pulling force. As the pin 209 of the fastening pin 102 moves upward, the sleeve positioning member 303 at the bottom of the sleeve component 106 gradually moves downward from the second positioning region 206 to engage the outer surface of the lower large-diameter rod section 204 and finally engage the lower first positioning region 205; and the second ends 306 of the fixing claws 304 gradually move downward from the upper large-diameter rod section 202 onto the conical surface 203 and in turn back to the outer surface of the small-diameter rod section 201 with the guidance of the conical surface 203. In this process, since the smooth bevels 307 on the second ends 306 provide the fixing claws 304 with decreasing thickness from the positions near the middles of the fixing claws 304 to the second ends 306, the fixing claws 304 are able to smoothly withdraw downward from the insertion hole 605 to be outside the small-diameter rod section 201 without an interference of the outer surfaces of the fixing claws 304 with the inner surface of the insertion hole 605. When the fixing claws 304 on the left and right sides of the fastener 100 are located outside the small-diameter rod section 201, the two fixing claws 304 respectively retract inward and the fastener 100 is in the release state.

Figure 9:
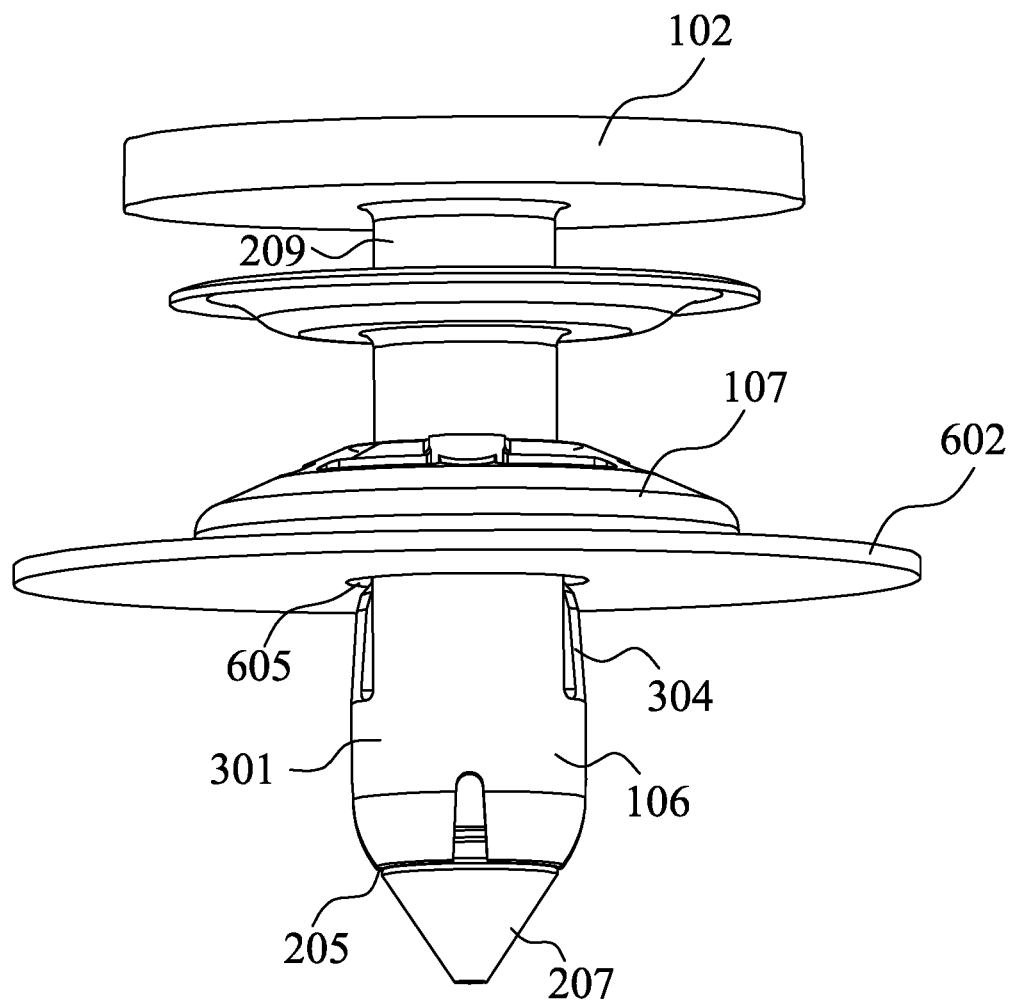
FIG. 9 is a perspective view illustrating the fastener shown in FIG. 8A being removed from the fixed plate 602.

FIG. 9 is a perspective view illustrating the fastener 100 shown in FIG. 8A is removing from the fixed plate 602. FIG. 9 also omits the automobile interior trim panel (i.e., the movable plate 601) received at the upper portion of the fastener 100, but only shows when that the fastener 100 is removing from the automobile inner sheet metal (i.e., the fixed plate 602). As shown in FIG. 9, when the fastening pin 102 moves upward relative to the sleeve component 106 and the annular sealing member 107 with the upward force F, the fastener 100 returns to the release state as in FIG. 7A, in which state the fixing claws 304 are in the release position where the fixing claws 304 retract inward since they are located outside the small-diameter rod section 201. In the release state of the fastener 100, the outer surfaces of the fixing claws 304 are flush with the outer surface of the sleeve main body 301 or retract from the outer surface of the sleeve main body 301. Accordingly, the fixing claws 304 are no longer engaged into the insertion hole 605 of the automobile inner sheet metal since the inner diameter of the insertion hole 605 is slightly larger than the outer diameter of the sleeve main body 301. Then, the fastener 100 engaging the automobile interior trim panel is able to be removed from above the insertion hole 605 of the automobile inner sheet metal, thereby realizing the separation of the automobile interior trim panel from the automobile inner sheet metal.

During the course of pulling the fastener 100 out of the automobile inner sheet metal, with the stretch and retraction of the fixing claws 304, the sleeve component 106 and the annular sealing member 107 disposed around the top of the sleeve component 106 can be smoothly removed from the automobile inner sheet metal with the fastening pin 102 without destroying the original structure of the fastener 100. Hence, the fastener 100 can be repeatedly inserted and removed.

The fastener 100 of the present application comprises a fastening pin 102 and a sleeve component 106 disposed around the fastening pin 102. The sleeve component 106 comprises stretchable and retractable fixing claws 304. The pin 209 of the fastening pin 102 comprises a small-diameter rod section 201 and an upper large-diameter rod section 202 located above the small-diameter rod section 201. Such configurations enable the fastening pin 102 to be movable up and down relative to the sleeve component 106, and enable the fixing claws 304 to stretch outward with the press exerted by the upper large-diameter rod section 202 so as to provide an upward support to the automobile inner sheet metal when the upper large-diameter rod section 202 of the fastening pin 102 is located inside the fixing claws 304. Accordingly, the automobile inner sheet metal is fastened outside the fixing claws 304, and the fastener 100 is in the locked state. When the fastener 100 in the locked state is required to be pulled out of the automobile inner sheet metal, the fastening pin 102 is pulled up to position the small-diameter rod section 201 inside the fixing claws 304 where the fixing claws 304 retract inward without being exerted with a pressure by the small-diameter rod section 201. Then, the whole fastener 100 can be separated from the automobile interior trim panel. The structural design of the fastener 100 enables it to be pulled out of the automobile inner sheet metal without destroying its original structure. Hence, the situation that some parts are left on the automobile inner sheet metal resulted from the destruction of the structure of the fastener will not occur.

Although only some features of the present application are illustrated and described herein, those skilled in the art may make various improvements and changes. Therefore, it should be understood that the appended claims are intended to cover all the foregoing improvements and changes that fall within the substantial spirit and scope of the present application.

The invention claimed is:

1. A fastener comprising:
    a fastening pin, including:
        a head; and
        a pin connected to the head, the pin having an upper large-diameter rod section and a small-diameter rod section, the upper large-diameter rod section being closer to the head than the small-diameter rod section, the small-diameter rod section having a smaller cross section area than the upper large-diameter rod section; and
    a sleeve component, including:
        a sleeve main body having a through hole extending axially though the sleeve main body along a central axis of the sleeve main body and at least two windows extending though the sleeve main body to the through hole, the through hole being configured to receive the pin of the fastening pin; and
        at least two fixing claws, each of the fixing claws having a fixed end attached to a bottom edge of the respective windows and a free end that is opposite the fixed end, the free ends being biased substantially inwardly within the through hole relative to the fixed ends when the fixing claws are in a free state such that the free ends are closer to the central axis of the sleeve main body than the fixed ends, wherein the fixing claws are configured to be moveable within the respective windows from the free state such that, when the pin of the fastening pin is partially inserted into the through hole of the sleeve main body, the fixing claws are in a release position corresponding to the free state with the free ends being adjacent to the small-diameter rod section of the fastening pin, and, when the pin of the fastening pin is fully inserted into the through hole of the sleeve main body, the fixing claws are in a locked position with the free ends being moved outwardly relative to release position and abutting the upper large-diameter rod section of the fastening pin.

2. The fastener of claim 1, wherein the pin includes a lower large-diameter rod section; and wherein the small-diameter rod section is located between the upper large-diameter rod section and the lower large-diameter rod section.

3. The fastener of claim 1, wherein the fastener is locked on a fixed plate when the fixing claws are in the locked position; and wherein the fastener is released from the fixed plate when the fixing claws are in the release position.

4. The fastener of claim 1, wherein a radially outer surface of the fixing claws near the free ends engage an inner surface of an insertion hole of the fixed plate when the fixing claws are in the locked position.

5. The fastener of claim 2, wherein the pin further includes a first positioning region and a second positioning region that are both disposed on an outer surface of the lower large-diameter rod section, the first positioning region being spaced apart from the second positioning region along the lengthwise of the lower large-diameter rod section, the first positioning region being further away from the head than the second positioning region;

wherein the sleeve component further includes a sleeve positioning member that is disposed on an inner wall of the sleeve main body and is configured to be engaged in the first positioning region and the second positioning region; and wherein the fixing claws are in the release position when the sleeve positioning member is engaged in the first positioning region and in the locked position when the sleeve positioning member is engaged in the second positioning region.

6. The fastener of claim 1, wherein the small-diameter rod section is located adjacent to the upper large-diameter rod section along the lengthwise of the fastening pin; and wherein the small-diameter rod section transitions to the upper large-diameter rod section through a conical surface.

7. The fastener of claim 4, wherein the radially outer surface is a bevel.

8. The fastener of claim 5, wherein the first positioning region and the second positioning region are both grooves disposed around an outer periphery of the lower large-diameter rod section; and wherein the sleeve positioning member is a protrusion annularly disposed on an inner wall of the sleeve main body.

9. The fastener of claim 5, wherein the sleeve component further includes an annular fixing member that is disposed at an end of the sleeve main body proximate to the head of the fastening pin and extends outward around an outer surface of the sleeve main body.

10. The fastener of claim 9, wherein the fastener further includes an annular sealing member disposed around an outside of the annular fixing member.

11. A fastener, comprising:
a fastening pin; and
a sleeve that is configured to receive the fastening pin within a through hole, the sleeve having a body extending between a first end and a second end along a central axis of the body, the body having a pair of fixing claws extending from a fixed end connected to a bottom edge of a window formed in the body, each of the fixing claws having a free end that is opposite the fixed end, the free ends of the fixing claws being biased substantially inwardly within the through hole relative to the fixed ends when the fixing claws are in a free state such that the free ends are closer to the central axis of the body than the fixed ends, wherein an annular fixing member extends outwardly and obliquely about the first end of the body, and wherein a sleeve positioning member is disposed at the second end of the body and protrudes inwardly from an inner wall of the body.

12. The fastener of claim 11, wherein each of the fixing claws define a thickness that increases in a direction moving from the free end toward the fixed end.

13. The fastener of claim 12, wherein the free ends of the fixing claws are disposed substantially coplanar with the fixed ends when the fixing claws are in a locked state.

14. The fastener of claim 11, wherein the annular fixing member extends obliquely downwardly toward the second end of the body.

15. The fastener of claim 11, wherein the annular fixing member has a peripheral edge and a plurality of slots spaced radially along the peripheral edge.

16. A fastener, comprising:
a fastening pin, including:
a pin having a first end and a second end, the first end being fixedly connected to a middle of a bottom surface of a head, the second end having a conical tip; and
a dish-shaped support extending from the pin, the support being located between the first end and the second end of the pin; and
a sleeve, including:
a body defining a through hole extending along a central axis of the body from a first end to a second end of the body;
a pair of windows disposed between the first and second ends of the body; and
a pair of fixing claws located within the respective windows and having free ends biased inwardly within the through hole such that, when the fixing claws are in a free state, the free ends are closer to the central axis of the body than fixed ends of the fixing claws.

17. The fastener of claim 16, wherein the pin is configured to be inserted within the through hole of the sleeve to displace the fixing claws away from one another.

18. The fastener of claim 16, wherein the fastening pin and the sleeve are configured to be assembled to secure the fastener to a component that is captured between the fixing claws and an annular fixing member that extends about the first end of the body.

* * * * *